United States Patent [19]

Ingels

[11] 4,024,493
[45] May 17, 1977

[54] APPARATUS FOR MOTOR VEHICLE POSITION INDICATION

[76] Inventor: George W. Ingels, 2310 Ravenwood, Rte. 4, Norman, Okla. 73069

[22] Filed: June 7, 1974

[21] Appl. No.: 477,283

[52] U.S. Cl. .......................... 340/23; 235/150.27; 340/24; 340/324 A

[51] Int. Cl.² ...................................... G06F 15/48

[58] Field of Search ... 340/23, 24, 324 A, 324 AD; 235/150.27

[56] References Cited

UNITED STATES PATENTS

| | | | |
|---|---|---|---|
| 2,728,065 | 12/1955 | Hollman | 340/24 |
| 3,190,950 | 6/1965 | Ariessohn et al. | 340/24 |
| 3,400,364 | 9/1968 | Musgrave et al. | 340/24 |
| 3,789,198 | 1/1974 | Henson et al. | 340/24 |
| 3,845,289 | 10/1974 | French | 340/24 |

Primary Examiner—Marshall M. Curtis
Attorney, Agent, or Firm—Laney, Dougherty, Hessin & Fish

[57] ABSTRACT

Apparatus for tracking motor vehicle position relative to a starting point and for providing continual display of vehicle position. The apparatus includes a gyroscope and odometer for generating respective direction and distance electrical signals which are then converted to $x$ and $y$ deflection voltages for control of a cathode ray oscilloscope. An area map overlay may be included on the face of the oscilloscope; and, the position indication signals may be continually transmitted to a central location to provide reference indication as to a particular motor vehicle.

12 Claims, 5 Drawing Figures

APPARATUS FOR MOTOR VEHICLE POSITION INDICATION

BACKGROUND OF THE INVENTION

1. Field of the Invention

The invention relates generally to motor vehicle position indication devices and more particularly, but not by way of limitation, it relates to improved apparatus for maintaining indication of vehicle position to the operator and/or for providing indication to a central location dispatching entity.

2. Description of the Prior Art

The prior art includes various types of devices as utilized for moving vehicles, planes, ships and the like for utilizing gyroscopic and/or rate of speed indications. Such prior art teachings have generally been directed to military applications such as position indicating for ships and aircraft, and such high reliability equipment has generally taken the form of very complex electronic equipmentation utilizing radar and gyro information in a position keeping system. There appears to be little or no prior art developed with respect to the relatively simplified forms of device which might be suitable for automotive use wherein costly, high reliability and space consuming equipment may not be justified.

SUMMARY OF THE INVENTION

The present invention contemplates an automotive position keeping device utilizing gyroscope and odometer inputs to continually maintain a relative spot position indication on a cathode ray oscilloscope disposed in the vehicle in view of the operator. It is also contemplated that such position indication data can be modulated and transmitted to a central dispatching agency from one or more motor vehicles to provide continual indication of vehicle position to the central agency.

Therefore, it is an object of the present invention to provide a relatively low cost vehicle position indicator for motor vehicles.

It is also an object of the invention to provide a device for displaying vehicle location for the reference of the driver thereof.

It is yet another object of the present invention to provide a system for maintaining position reference of a fleet of motor vehicles at a centralized agency.

Finally, it is an object of the present invention to provide a vehicle position indication device of relatively high reliability but economy of construction consonant with the requirements of each individual motor vehicle user.

Other objects and advantages of the invention will be evident from the following detailed description when read in conjunction with the accompanying drawings which illustrate the invention.

BRIEF DESCRIPTION OF THE DRAWING

FIG. 3 is a schematic diagram of a gyroscopic reference device as may be utilized in the present invention;

DETAILED DESCRIPTION OF THE INVENTION

Figure 1:
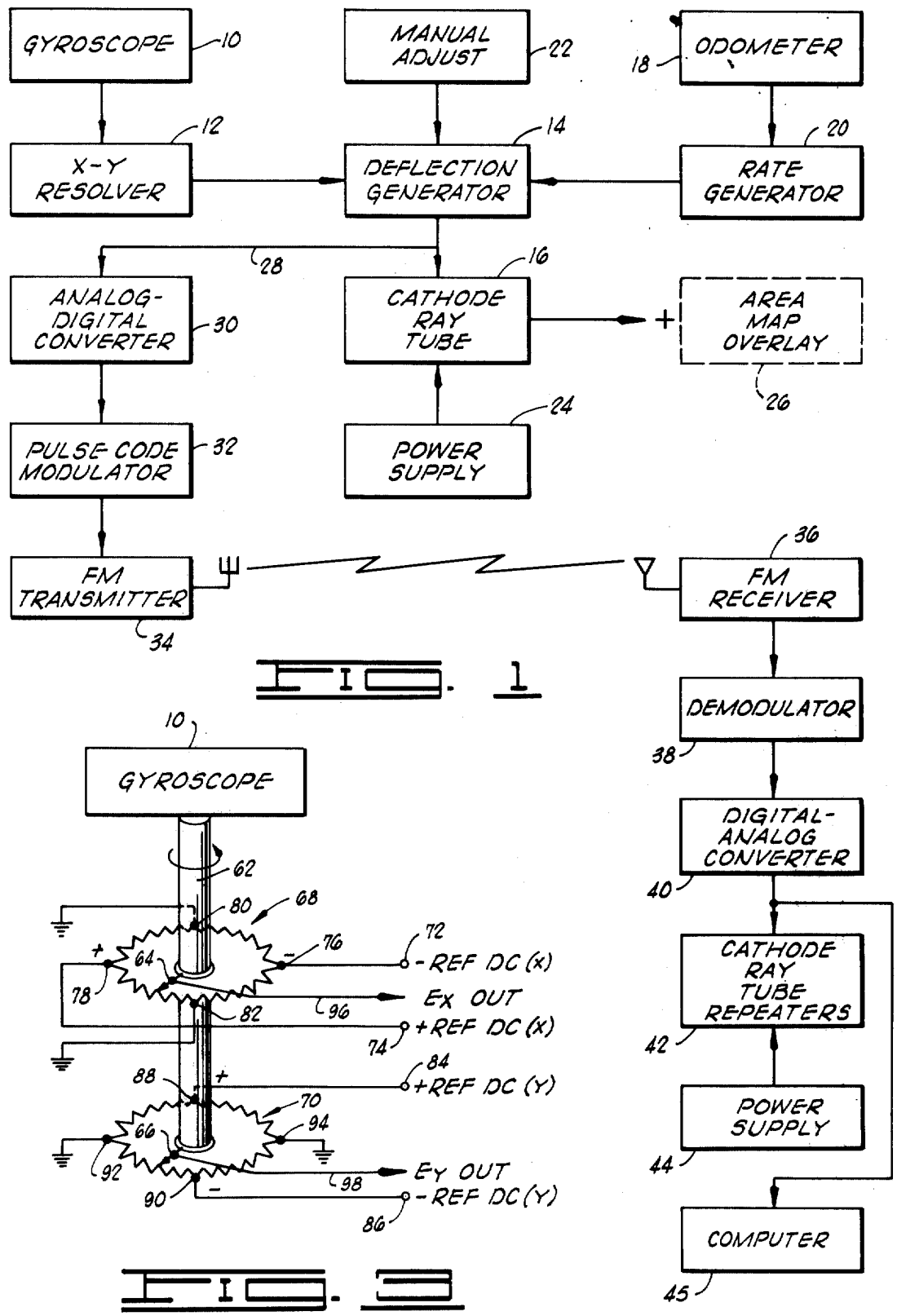
FIG. 1 is a block diagram of a position location system as constructed in accordance with the present invention.

FIG. 1 represents a generalized block diagram illustrating a form of position location system for use in automotive vehicles. The system utilizes a gyroscope 10 of the conventional type for referencing directionality and a suitable form of x-y resolver 12 for determining $x$ coordinate and $y$ coordinate reference voltages for output to a deflection generator 14 operatively associated with a cathode ray tube 16. An odometer 18 provides distance data output to a suitable rate generator 20 which develops the requisite pulse or voltage signal for input to deflection generator 14. Thus, in its most basic form, it is the aim of the invention to provide in a motor vehicle a cathode ray tube spot indication wherein, after initial calibration and zero adjustment by a manual adjust 22, the cathode ray tube 16 will display an $x/y$ coordinate movement in proper direction and proportionate distance of travel of the motor vehicle in which the system is installed.

The cathode ray tube 16 as well as other component parts of the system are powered by a conventional form of power supply 24 as may be operated from the conventional automotive +12 volt power supply or the like.

An area map overlay 26, to be further described below, designed in conformance to the diameter of the cathode ray tube 16 and the range switch capabilities, may be placed in overlay over the cathode ray tube face such that the system can be zeroed to control the cathode ray spot to trace the vehicles path in relation to the map overlay 26. Area map overlays 26 can be designed in proper size for any area of interest once standard calibration procedures of cathode ray tube 16 are in effect.

Output voltage indications from deflection generator 14 via line 28 may also be transmitted to a remote repeater station having a similarly calibrated cathode ray tube 16 which is capable of then reproducing vehicle position at the remote location. In this instance, the direction and distance voltage indications from deflection generator 14 are converted analog to digital in a converter stage 30 for subsequent pulse code modulation in a conventional modulator stage 32. The pulse code modulation may then be transmitted via frequency modulation in fm transmitter 34 for reception at fm receiver 36 and subsequent demodulation in demodulator 38. The digital signals are once again converted in digital-analog converter 40 for application to a cathode ray tube repeater 42 which, under control of a power supply 44, provides cathode spot tracing of the vehicle route. Here again, an area map overlay 26 may be utilized at the repeater CRT 42. A computer 45 at a central location may be utilized to process and store all route data for one or more vehicles.

Figure 2:
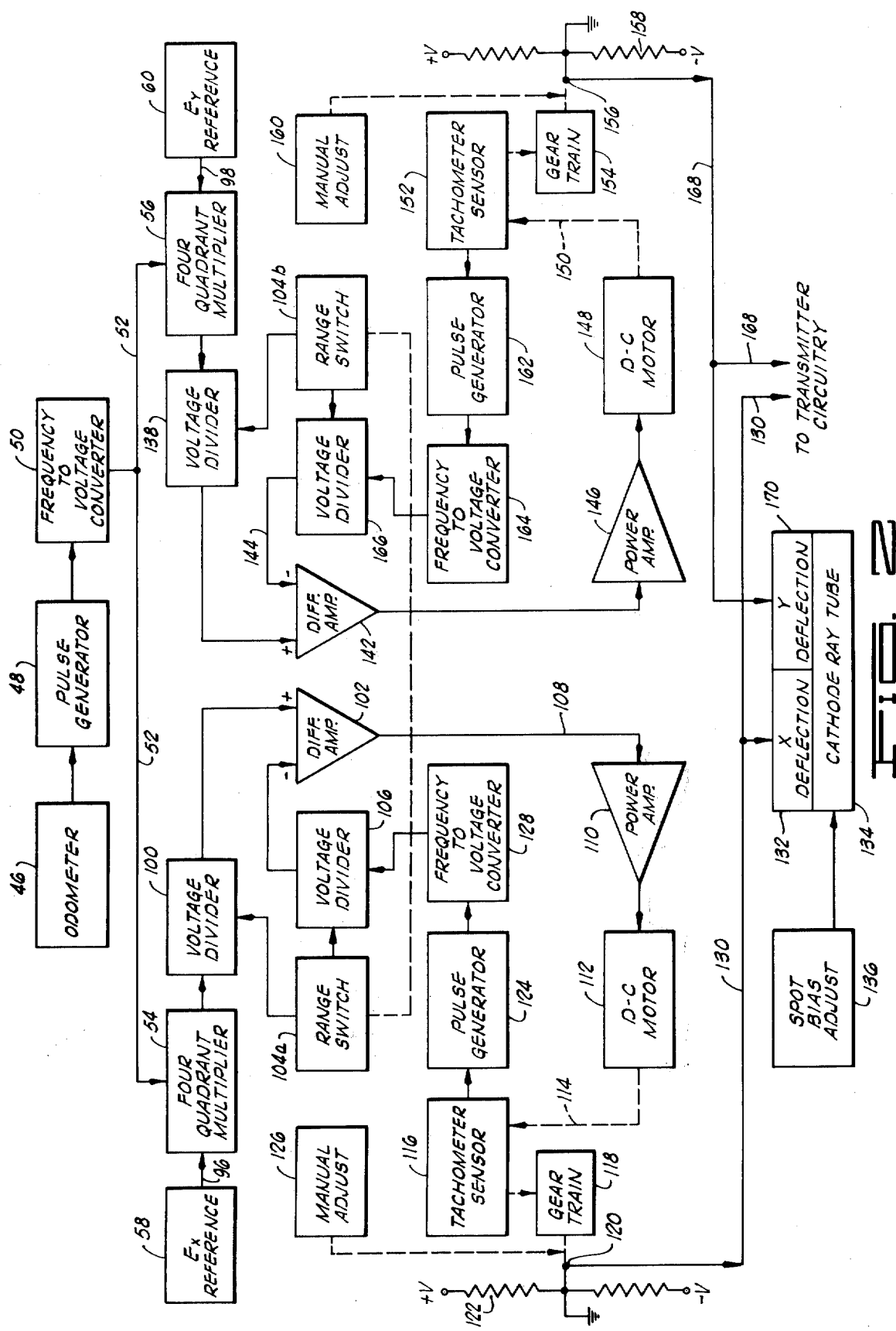
FIG. 2 is a block diagram of a preferred form of the present invention.

FIG. 2 illustrates a preferred embodiment of the present invention, a servo controlled circuit for deriving directionality voltages $E_x$ and $E_y$ as varied to proper distance indication by odometer input. Thus, a standard form of odometer 46 provides a periodic output, either mechnaical or electronic, in accordance with a distance measure to control a pulse generator 48 which provides electrical pulse rate signal output in proportion to the distance traveled by the motor vehicle.

The proportional pulse rate output from pulse generator 48 is then applied to a conventional form of frequency to voltage converter to derive a d-c voltage having an amplitude which is proportional to input frequency. Any of various well-known frequency to voltage converter circuits may be utilized in this application, e.g. a basic form of properly timed integrator circuit should perform the requisite function, and, specifically, a pulse rate converter commercially available from Bell and Howell, Type 19-106, is more than adequate for the application.

Output from frequency to voltage converter 50 in the form of a d-c porportional voltage is present on line 52 for input to each of four quadrant multipliers 54 and 56 working in association with the $X$ reference and the $Y$ reference circuits respectively. And $E_x$ reference voltage is derived as shown by block 58 for input to four quadrant multiplier 54 and an $E_y$ reference voltage, block 60, is supplied as one of dual inputs to four quadrant amplifier 56. Derivation of the $E_x$ and $E_y$ reference voltages may be carried out by any of well known means; however, the illustration of FIG. 3 shows a basic form of reference voltage derivation circuitry operating in conjunction with a gyroscope.

Referring now to FIG. 3, the gyroscope 10 is connected to couple inherent output rotation via a shaft 62 to respective wiper elements 64 and 66 of circular potentiometers 68 and 70. The circular reference potentiometers 68 and 70 are energized in quadrature displacement; that is, potentiometer 68 is energized between reference dc inputs 72 and 74 as connected to opposite sides of potentiometer 68 at terminals 76 and 78, respectively. The remaining 90° terminals 80 and 82 are then grounded. The similar reference dc voltage is applied at terminals 84 and 86 for connection to opposite terminals 88 and 90, respectively, of potentiometer 70 but the opposite terminals 88 and 90 are 90° displaced from the energized terminals 76 and 78 of potentiometer 68. The opposite and intermediate terminals 92 and 94 of potentiometer 70 are then grounded. Thus, $E_x$ reference output from wiper 64 via lead 96 will provide an $x$ coordinate sine function output voltage while the $E_y$ output via line 98 will provide a proportional $y$ coordinate sine function voltage output.

Referring again to FIG. 2, the $E_x$ reference voltage on lead 96 is applied to one of dual inputs to four quadrant multiplier 54 along with the rate voltage on lead 52 for transconductance modulation of the voltage. A suitable circuit for the four quadrant multiplier 54 may be a commercially available integrated circuit of the Motorola type MC1596G. A corrected voltage output is then applied to a voltage divider 100 which performs the function of scaling the voltage for input to a differential amplifier 102 that performs correction in accordance with the feedback function, to be further described. The scaling circuit or voltage divider 100 is directly controlled in accordance with a range switch section 104a of conventional structure which sets the overall range of voltage values being processed by the circuitry in accordance with distance and direction considerations. Output from range switch 104 is also applied through a voltage divider 106 for scaling the feedback output as applied to the negative terminal of differential amplifier 102.

Output from the differential amplifier 102 is applied via line 108 to a power amplifier 110 which is connected directly to drive a d-c motor 112 in conventional manner. Accordingly, the rotational output from d-c motor 112 is applied via mechanical linkage 112 through a tachometer 116 and gear train 118 to drive a wiper arm 120 of a reference potentiometer 122. The tachometer sensor 116 may be any of various commercially available types, e.g. magnetic rpm sensing and operational amplifier output, and adapted to provide an electrical output proportional to rate of revolution for input to a pulse generator 124. Gear train 118 is, of course, regulated as to input/output ratio in accordance with the exigencies of the particular structure and serve to adapt the dc motor 112 revolution in accordance with the requirements of the drive structure of deflection potentiometer 122. A manual adjust 126, available at the front panel of the equipment, may be utilized to provide a zero adjust to establish relative position at the beginning of vehicle movement.

The pulse generator 124 provides output to frequency to voltage converter 128 to derive a d-c voltage proportional to the sensed tachometer rate or pulse rate output of pulse generator 124. If desired, the Bell and Howell Type 19-106 pulse rate converter may be utilized in place of both of pulse generator 124 and frequency to voltage converter 128. This converter module is specifically adapted for conversion of pulse rate signals into a dc voltage proportional to pulse rate and is particularly adapted for accepting the outputs of most tachometer sensors, flow meters, and the like. The output from frequency to voltage converter 128 is then applied through the scaler or voltage divider 106 for differential input to differential amplifier 102, thus completing the servo loop maintaining linear drive control of d-c motor 112.

The d-c motor 112 rotation, as transmitted through tachometer sensor 116 and gear train 118, will drive the potentiometer wiper 120 along reference potentiometer 122 to provide continual d-c X-deflection output on a lead 130 for input to the X-deflection circuitry 132 of cathode ray tube 134. The cathode ray tube 134 may be any of selected conventional types and spot bias adjustment 136 may be utilized for setting the brightness of the tube face reference spot during operation. The X deflection lead 130 is also made available for output to transmitter circuitry as will be further described below relative to FIG. 4.

The $E_y$ reference voltage is derived in identical manner to $E_x$ reference voltage previously described. Thus, the $E_y$ reference circuit 60 provides input via line 98 to four quadrant multiplier 56 along with odometer pulse rate data after conversion from frequency to d-c voltage for input via lead 52. The multiplier output voltage is then applied through a voltage divider 138, a conventional scaling circuit, which also functions under the control of the proportioning range switch section 104b in well-known manner. Output from voltage divider 138 is then applied to a differential amplifier 142 along with a servo reference voltage on lead 144 to provide output to a power amplifier 146 which, in turn, controls direction and amount of revolution of a d-c motor 148.

Output rotation from d-c motor 148 is transmitted via linkage 150 to tachometer sensor 152 which transmits rotation through gear train 154 to drive potentiometer wiper 156 for continual positioning along the deflection reference potentiometer 158. A manual adjust 160 provides zero calibration adjustment. The tachometer sensor 152 provides the source for servo feedback and applies proportional revolutions pulse data through a pulse generator 162 and frequency to voltage converter 164. The output from frequency to voltage converter 164 is then in the form of a d-c proportional voltage for feedback conduction through a scaler or voltage divider 166, scaled by input from range switch 140b, which provides output via line 144 to the differential input of differential amplifier 142.

Deflection output from wiper element 156 is applied via lead 168 for input to the Y deflection circuitry 170 of cathode ray tube 134. The Y deflection voltage on lead 168 is also made available to transmitter circuitry as will be further described.

Figure 4:
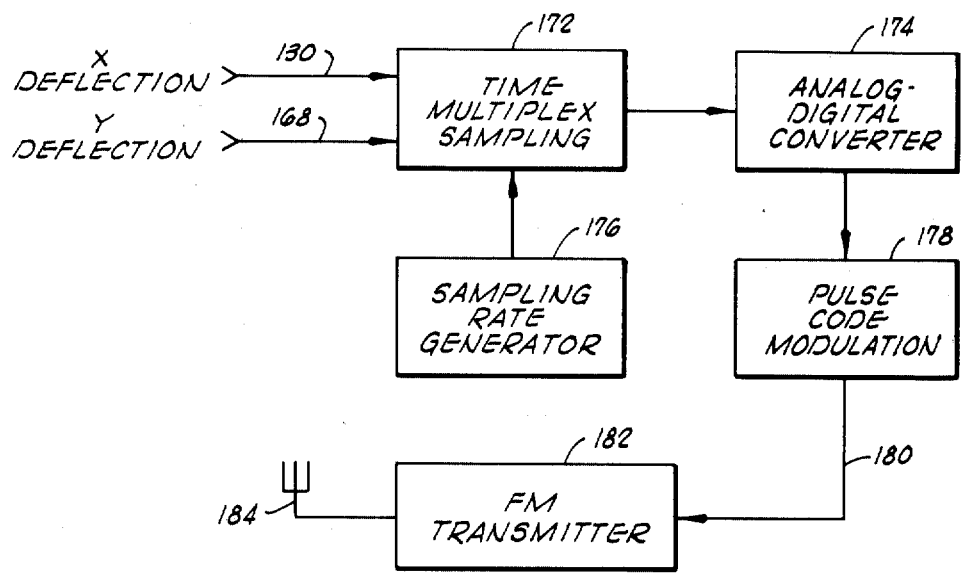
FIG. 4 is a block diagram of one form of data transmission apparatus which may be used with the present invention.

Referring now to FIG. 4, X deflection and Y deflection voltages on leads 130 and 168 (FIG. 2) may be applied in conventional manner to a time multiplex sampling circuit 172 which functions to periodically sample the input deflection voltages in time successive manner to provide analog output to an analog-digital converter 174. A sampling rate generator 176 provides pulse output at requisite rate to control the sampling rate and duration within time multiplex sampling circuit 172.

The output from analog-digital converter 174 is then applied to a pulse code modulation stage 178 for conventional digital signal modulation whereupon the code modulated output on line 180 is applied to fm transmitter 182 for energization of transmitting antennae 184. The fm transmitter 182 would preferably include a crystal controlled output oscillator of characteristic frequency and identifying a particular vehicle by frequency allocation.

A central receiver station such as that shown in FIG. 1, may include fm receiver 36 or a plurality of such receivers each tuned to a characteristic frequency identifying a selected vehicle in the area. Upon demodulation and reestablishment of the X and Y deflection voltages a plurality of individual cathode ray tube repeaters 42 may be utilized, each identifying a selected vehicle of the fleet, and which is transmitting at its own characteristic frequency. The position data information or X and Y deflection voltages can alternatively be applied to the computer 45 which may be properly programmed to maintain position identification of all vehicles in the area and which may also receive other input relative to the vehicles for associated storage in computer 45. Thus, by proper utilization of the computer storage, a printout for a particular vehicle over a selected period of time may be acquired in order to verify or provide a complete routing of where the particular vehicle travelled during its on-duty use.

Figure 5:
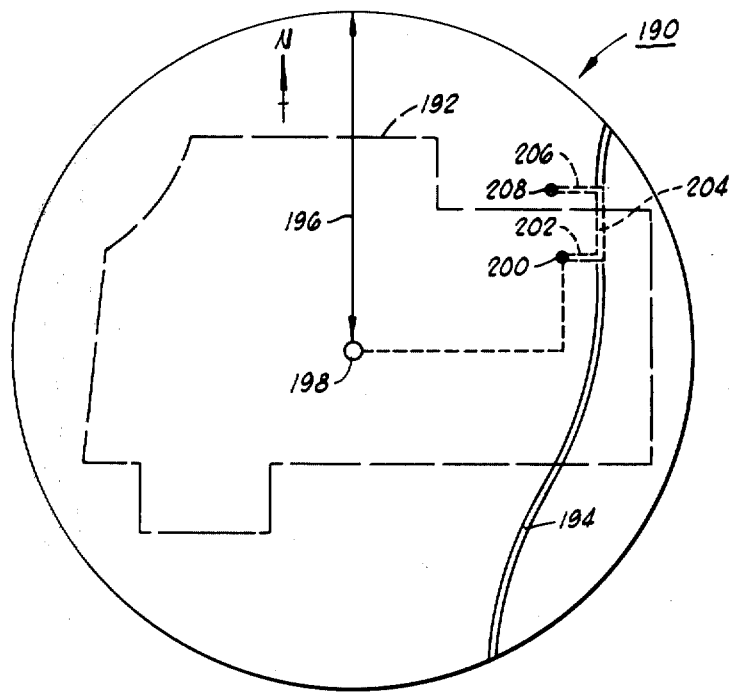
FIG. 5 is a depiction of a cathode ray oscilloscope overlay mask which may be utilized in the present invention.

FIG. 5 illustrates a typical form of map overlay 190 which may be formed of clear plastic material to include map linings defining city limits 192, major highway 194 and/or other landmark or central locations as desired. The radius of the cathode ray tube as shown by arrow 196 must be matched to the map overlay radius, and a multiple of map overlays 190 of different calibrated radii may be employed, one for each step of the range switch 104 (FIG. 2).

At some starting point the vehicle operator will adjust his cathode ray tube spot for placement at his location. For example, in FIG. 5, from a center point 198 eastward and north to starting point 200. Thereafter the circuitry will automatically track and control spot movement as the vehicle proceeds eastward along indication 202 and north along super highway 194 until the vehicle turns west on route 206 to arrive at a point 208. Such spot movement can be observed by the operator of the motor vehicle in which cathode ray tube is installed or, the same data can be transmitted via a transmitter system as shown in FIG. 4 to provide such surveillance data to a central location, e.g. a police or taxi cab dispatching agency. As previously discussed, the same information can be continually input for storage in a general purpose computer system such that an on-duty route of one of the vehicles can always be re-called from storage and printed out to show the vehicle movement during its entire duty tour.

The foregoing describes a novel vehicle tracking and indication system which can be constructed and utilized with relatively much greater economy than presently known direction and location systems. In addition, the system has capability of being used for leisure time tracking or auto amusement, as well as service vehicle tracking, and various applications wherein it is desirable to maintain position and route knowledge relative to a plurality of vehicles. It is also contemplated that the device can be used with emergency vehicles who must travel at increased speed through downtown areas, as the central indication will provide the dispatching agency with forewarning in order to change traffic lights or otherwise clear the emergency route. Still other forms of mass transit vehicle and systems presently in genesis may well employ the present invention and equivalents for position keeping and system surveillance.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:
1. An improved system for maintaining position surveillance of motor vehicles comprising:
 odometer means for generating an output d-c voltage which is proportional to the distance travelled by said motor vehicle;
 gyroscope control means for generating an $E_x$ d-c voltage proportional to X coordinate direction of travel of said motor vehicle and for generating an $E_y$ d-c voltage proportional to vehicle movement in the Y coordinate direction by said motor vehicle;
 first multiplier means receiving said distance proportional d-c voltage and said $E_x$ d-c voltage at the input to provide an X coordinate output voltage;
 second multiplier means receiving said distance proportional d-c voltage and said $E_y$ d-c voltage to provide a Y coordinate output voltage;
 first servo means including a first d-c drive motor and differential amplifier means, said differential amplifier means receiving as input said X coordinate output voltage to provide drive output to said first d-c motor to produce first rotational output, and including tachometer sensor means responsive to said rotational output to feedback a servo control voltage for input to said differential amplifier;
 second servo means including second d-c drive motor and differential amplifier means, said differential amplifier means receiving as input said Y coordinate output voltage to provide drive output to said second d-c motor to produce second rotational output, and including tachometer sensor means responsive to said rotational output to feedback a servo control voltage for input to said differential amplifier; and
 first deflection potentiometer means wherein the wiper element thereof is bidirectionally driven by said first rotational output to provide an X deflection voltage output;

second deflection potentiometer means wherein the wiper element thereof is bidirectionally driven by said second rotational output to provide a Y deflection voltage output; and cathode ray tube means providing a visible spot having its position controlled in response to X and Y deflection as controlled respectively by said X and Y deflection voltages.

2. A system as set forth in claim 1 which is further characterized to include:

data transmission means operating at characteristic frequency for transmitting said X deflection voltage output and Y deflection voltage output indications for reception at a remote location; and cathode ray tube means located at said remote location to provide a visible spot having its position controlled in response to X and Y deflection as controlled respectively by said X and Y deflection voltages.

3. A system as set forth in claim 1 which is further characterized to include:

data transmission means operating at characteristic frequency for transmitting said X deflection voltage output and Y deflection voltage output indications for reception at a remote location; and computer means located at said remote location for receiving and providing continual accessible storage of said X and Y deflection voltages for said motor vehicle for a pre-determined period of time.

4. A system as set forth in claim 1 wherein each of said first and second multiplier means comprise:

four quadrant multiplier means receiving each of said rate proportional d-c voltage and a respective directional d-c voltage at the input to provide a respective coordinate output voltage; and voltage divider means receiving said respective coordinate output voltage at the input and controlled by range switch means to provide a scaled output voltage for input to said differential amplifier means.

5. A system as set forth in claim 1 wherein each of said tachometer sensor means comprise:

tachometer means providing output indication of said d-c motor rotational output;

pulse generator means responsive to said rotational output indication to generate output pulses at a rate proportional to said rotational output; and frequency to voltage converter means receiving as input said generated output pulses to provide output of said servo control voltage.

6. A system as set forth in claim 2 wherein said data transmission and receiving means comprises:

transmitter means operating at a characteristic carrier frequency;

modulator means receiving said X and Y deflection voltage outputs for frequency modulation on said carrier frequency;

means for receiving and demodulating said carrier frequency to provide output of said X and Y deflection voltage outputs for control of said cathode ray tube repeater means.

7. An improved system for maintaining position surveillance of motor vehicles at a central location, comprising:

means for generating an X coordinate analog control voltage having an amplitude and polarity which is proportional to distance movement of said motor vehicle in a first direction from a pre-set reference point;

means for generating a Y coordinate analog control voltage having an amplitude and polarity which is proportional to distance of movement of said motor vehicle in a second direction from said preset reference point and said second direction being ninety degrees displaced from said first direction;

visual indicator means on said vehicle;

deflection generator means receiving said X and Y analog control voltages to generate X and Y control signals controlling indicated position from said preset reference point on said visual indicator means;

means for transmitting said X and Y coordinate control voltage indications from said vehicle at characteristic frequency and for receiving the transmitted control voltage indications at a central location; and computer means at said central location, and including accessible storage for continually receiving said X and Y coordinate control voltage indications for storage thereof.

8. A system as set forth in claim 7 wherein said means for transmitting comprises:

transmitter means operating at a characteristic frequency;

modulator means receiving said X and Y deflection voltage outputs for frequency modulation on said carrier frequency;

means for receiving and demodulating said carrier frequency to provide output of said X and Y deflection voltage outputs for control of cathode ray tube repeater means.

9. A system as set forth in claim 7 wherein said means for transmitting comprises:

analog-digital converter means receiving said X and Y coordinate control voltages to provide X and Y digital outputs;

transmission means operating at a characteristic carrier frequency and including modulation means for modulating said X and Y digital signals on said carrier;

receiver means located at said central location and including demodulator means for demodulating said X and Y digital signals for direct input to said computer means.

10. A system as set forth in claim 1 which is further characterized to include:

transparent overlay means having predesignated map markings and area proportional to said cathode ray means indicator face.

11. A system as set forth in claim 10 which includes:

calibration adjustment means for pre-setting said visible spot to a selected position on said overlay means upon commencing movement of said motor vehicle.

12. A system as set forth in claim 7 which is further characterized to include:

at least one visual indicator controlled in response to data output from said computer means to provide indication of relative coordinate position of selected motor vehicles.

* * * * *